Sept. 24, 1968  R. W. ROBBINS, JR  3,402,734

BALANCED PISTON RELIEF VALVE

Filed May 26, 1966

INVENTOR.
ROLAND W. ROBBINS, JR.
BY
V. C. MULLER
ROY MILLER
ATTORNEYS.

United States Patent Office 3,402,734
Patented Sept. 24, 1968

3,402,734
BALANCED PISTON RELIEF VALVE
Roland W. Robbins, Jr., Arnold, Md., assignor to the United States of America as represented by the Secretary of the Navy
Filed May 26, 1966, Ser. No. 553,606
3 Claims. (Cl. 137—491)

The invention described herein may be manufactured and used by or for the Government of the United States of America for governmental purposes without the payment of any royalties thereon or therefor.

This invention relates to improvements in pressure relief or safety valves employed in fluid pressure systems.

Included among the various types of valves for preventing undesired overpressure in hydraulic and other fluid pressure systems, are spring loaded poppet valves which open in opposition to a spring, thus allowing fluid to escape from the system until the system pressure drops to a desired value. While valves of this type are probably the most simple in construction and least costly, they, like other known relief valves, have various disadvantages including premature leakage or "dribble," valve oscillation or "chatter," inability to cope with transient pressure surges, and poor regulation. These disadvantages are well described in an article entitled, "Relief Valves, by Stanley Kowalski, published in "Missile Design and Development," June 1960.

While certain of the disadvantages of poppet type relief valves have been obviated by other types, as exemplified by Patent No. 2,587,161 to Huber, they are, in general, quite complicated and costly of manufacture by reason of their many precision parts.

One of the objects of this invention is to obviate certain of the disadvantages, above referred to, of poppet type relief valves.

Another object, consonant with the foregoing object, is to provide a poppet relief valve of simplified construction which may be manufactured at low cost.

A further object is to provide a poppet type relief valve which seats with increasing pressure, as system pressure increases, in contradistinction to decreasing seat pressure, as conventional in prior art poppet valves, and then opens fully when the design or cracking pressure is reached.

Still further objects, advantages, and salient features will become apparent from the description to follow, the appended claims, and the accompanying drawing, in which:

Figure 1:
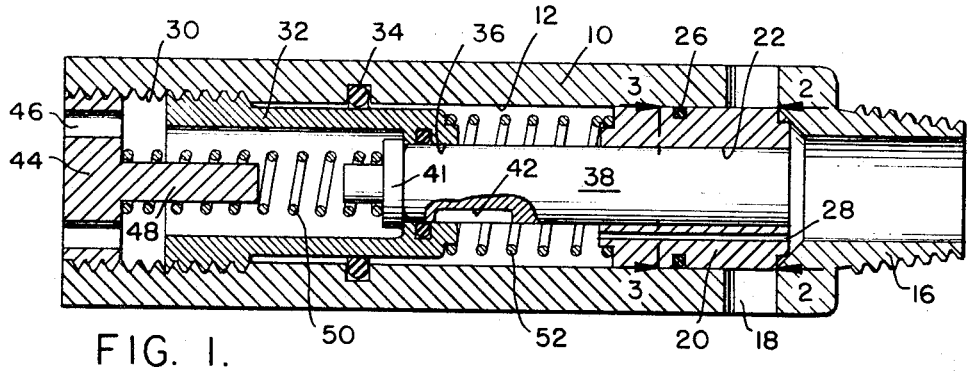
FIG. 1 is longitudinal central section of the subject of the invention, in one position of its parts.

Referring now to the drawing, and first to FIG. 1, the subject of the invention comprises a valve body 10 having a cylindrical bore 12, terminating at one end in a frusto-conical valve seat 14, a hollow threaded pipe fitting portion 16, adapted to be connected to a pressure system, communicating with the bore. A plurality of angularly spaced discharge orifices 18 also communicate with the bore and provide communication to a reservoir or the like (not shown) to which fluid may be delivered when the poppet valve opens.

Poppet valve 20 is cylindrical to slideably fit within bore 12 and is provided with a central bore 22. The right end, as shown, is tapered to conform to the shape of seat 14, and the left end is provided with a shouldered portion 24 which centers a spring, to be subsequently described. An O-ring 26, carried by the poppet valve, prevents leakage along its outer surface, and a small metering orifice 28, extending between opposite ends of the valve, provides communication between its opposite end surfaces, for a purpose to be subsequently described.

The left end of body 10 is provided with internal threads 30 which threadedly receive a sleeve 32 which is sealed to the body by an O-ring 34. The right end of the sleeve is provided with a central bore 36 which slideably receives a piston or pilot valve member 38, an O-ring 40 being provided to prevent leakage between the pilot valve and the bore of the sleeve. Pilot valve 38 slideably fits within bore 22 of the poppet valve and is provided with a flange 41 for limiting its motion in one direction. A longitudinally extending slot or groove 42 is milled into pilot valve 38 for a purpose to be subsequently described. Threads 30 also receive a plug-like adjustment member 44, having apertures 46 extending therethrough, the plug member also having a projection 48 which centers a spring 50 which extends between the plug member and one end of the pilot valve. This spring, as will subsequently more fully appear, exerts a force on the pilot valve substantially equal to the force created by the system pressure, within fitting 16, acting upon the exposed right end area of the pilot valve. As will be apparent, by suitable choice of spring 50 and adjustment of plug 44 the spring force exerted on the pilot valve may be so chosen to balance a system pressure at which relief or cracking is desired. Spring 52, extending between sleeve 32 and poppet valve 20, is a relatively light spring exerting only sufficient force on the poppet valve to move it but not to balance the system fluid pressure acting upon its exposed right end.

Figures 2, 3:
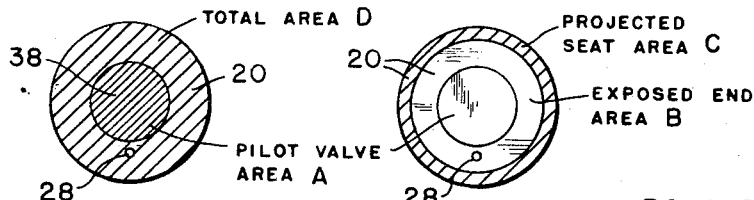
FIG. 2 is an end elevation and section taken along line 2—2, FIG. 1.
FIG. 3 is a section taken along line 3—3, FIG. 1.

Referring now to FIG. 2, it will be apparent that system pressure is at all times acting on area A of the pilot valve; that when the poppet valve is closed, system pressure also acts on the annular exposed end portion or area B of the poppet valve; and that when the poppet valve opens, system pressure acts upon area B and also area C, which is the projected area of the frusto-conical end portion of the poppet valve. It will also be apparent that fluid pressure applied through orifice 28 acts on the rear or left end of the poppet valve, this area also being equal to B plus C, or as otherwise stated, the annular cross sectional area of the poppet valve.

In operation, let it first be assumed that system pressure in fitting 16 is considerably below relief or cracking pressure. System pressure is now being applied through orifice 28 to the entire area D of the poppet valve at its left or rear face. The same pressure, however, is applied only to area B, hence the pressure tending to maintain the poppet valve on its seat is system pressure acting on area D minus area B. Otherwise stated, the force tending to maintain the poppet valve on its seat is the projected area of its frusto-conical end (area C) times system pressure. It thus becomes apparent that as pressure increases toward cracking pressure, the poppet valve continues to increase its pressure on its seat, in contradistinction to a conventional poppet valve which tends to decrease pressure on its seat as system pressure increases.

Figure 1A:
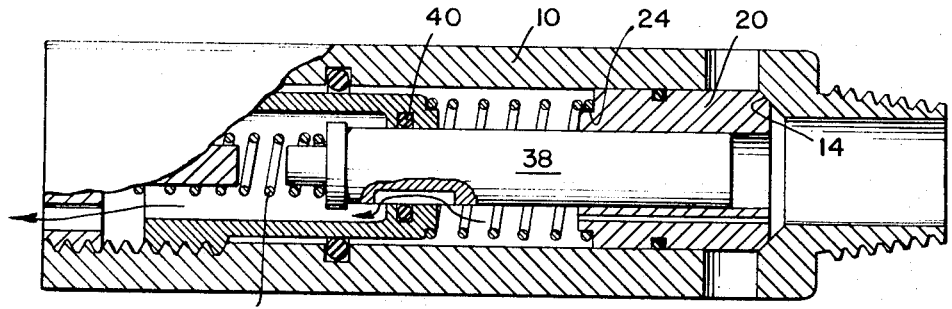
FIG. 1A is a like section in another position of parts.
Figure 1B:
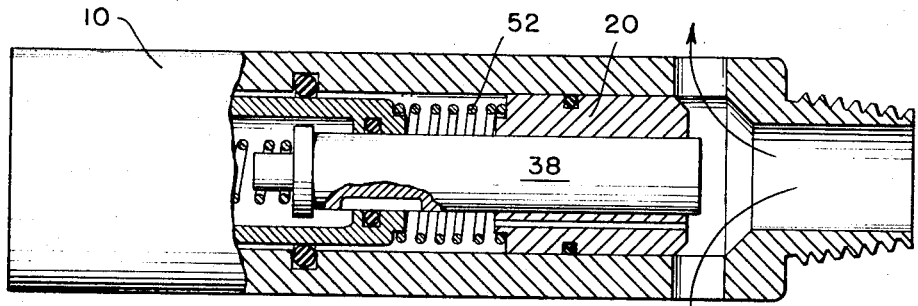
FIG. 1B is a like section in a further position of parts.

Let it now be assumed that system pressure is approaching cracking pressure. During this pressure increase, system pressure is acting upon the right end surface of the pilot valve, or area A as shown in FIG. 2, tending to move it in opposition to spring 50. As it increases to design or cracking pressure, slot 42 will bridge O-ring 40, as shown in FIG. 1A, and the pressure on the rear face of the poppet valve will suddenly drop. When this occurs, the poppet valve will suddenly open to full position as shown in FIG. 1B since system pressure is now acting only on area B. Moreover, as soon as the poppet valve begins to open, system pressure also acts on area C, further tending to move the poppet valve to full open position.

When the excess pressure has been relieved and system pressure has dropped below cracking pressure a reversed action occurs. First, spring 50 returns the pilot valve to its initial position of FIG. 1 wherein slot 42 no longer bridges O-ring 40. Pressure now increases on the rear face of the poppet valve to that exerted on its entire forward face. Since these forces are in balance, system pressure is ineffective to move the poppet valve toward closed position. Spring 52, however, provides the force for moving the poppet valve toward its seat and, as will be apparent, the rate of closure may be selected by proper choice of spring constant. Thus, a rapid rate of poppet valve opening may be obtained with a slower rate of closing, the latter often being desirable to obviate transient or "hammering" forces in the system.

Obviously many modifications and variations of the present invention are possible in the light of the above teachings. It is therefore to be understood that within the scope of the appended claims the invention may be practiced otherwise than as specifically described.

What is claimed is:

1. A pressure relief valve for hydraulic systems, comprising;
    (a) a valve body having a bore therein, terminating at one end thereof in an inwardly tapering valve seat;
    (b) a cylindrical poppet valve, having a central bore extending therethrough, and having a forward inwardly tapering end surface of a shape to conform to said valve seat, said poppet valve also having an annular forward surface disposed inwardly adjacent its tapering end surface and exposed to system pressure, said poppet valve also having a metering aperture extending between its opposite ends, permitting application of system pressure to its annular rear surface;
    (c) at least one outlet pressure relief passage communicating with the bore of the valve body, blocked by the poppet valve, when in closed position, and communicating with system pressure when the poppet valve moves a predetermined distance away from its seat;
    (d) a cylindrical pilot valve slideably disposed within the bore the poppet valve, said pilot valve having a circular end surface exposed to system pressure, said pilot valve having a portion disposed rearwardly of the rear face of the poppet valve in sealing engagement with the valve body, and providing a closed chamber adjacent the rear face of the poppet valve which may be pressurized to system pressure through said metering orifice, said pilot valve also having a channel therein adapted to bridge its sealing engagement with the body to thereby relieve the pressure in said chamber;
    (e) a spring for urging said pilot valve in a direction toward the poppet valve, adapted to exert a force thereon sufficient to balance a desired system pressure, below the design or cracking pressure at which the poppet valve may open;
    (f) and a return spring for moving the poppet valve to its seat after it has opened and system pressure has dropped to a desired value below cracking pressure;
    (g) the construction and arrangement being such that when the poppet valve is closed, it is maintained on its seat by the constant pressure of its return spring and the product of system pressure and the projected area of its tapering end, whereby increase in system pressure applied to its rear surface increases the pressure of the poppet valve on its seat, and when said pilot valve moves to a position to relieve pressure in said chamber, system pressure applied to the forward end of the poppet valve moves it to unblocked position relative to said outlet passage.

2. A valve in accordance with claim 1 wherein the bore of said valve body is provided with internal threads adjacent the end thereof remote from the poppet valve, a sleeve engaging the threads and having a central bore therein in which the pilot valve may slide in sealing engagement therewith, an adjustable abutment engaging said threads, said spring for urging said pilot valve being disposed between one end of the pilot valve and the adjustable abutment for adjusting the spring pressure to thereby select a cracking pressure in the system at which the pilot valve causes the poppet valve to move to open position.

3. A valve in accordance with claim 2 including an O-ring disposed around the central bore of the sleeve and engaging the pilot valve, the channel in the pilot valve adapted to bridge the O-ring when it moves to a predetermined position and permits relief of pressure in said chamber.

References Cited

UNITED STATES PATENTS

| | | | |
|---|---|---|---|
| 191,078 | 5/1877 | Scovell | 137—490 |
| 2,587,161 | 2/1952 | Huber | 137—490 |
| 2,601,870 | 7/1952 | Lee | 137—490 |

M. CARY NELSON, *Primary Examiner.*

ROBERT J. MILLER, *Assistant Examiner.*